United States Patent
Yu et al.

(10) Patent No.: US 11,363,190 B2
(45) Date of Patent: Jun. 14, 2022

(54) IMAGE CAPTURING METHOD AND DEVICE

(71) Applicant: BEIJING XIAOMI MOBILE SOFTWARE CO., LTD., Beijing (CN)

(72) Inventors: Pan Yu, Beijing (CN); Yuelin Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/844,144

(22) Filed: Apr. 9, 2020

(65) Prior Publication Data

US 2021/0160421 A1     May 27, 2021

(30) Foreign Application Priority Data

Nov. 22, 2019 (CN) .......................... 201911154438.4

(51) Int. Cl.
| | |
|---|---|
| *H04N 5/232* | (2006.01) |
| *H04N 5/262* | (2006.01) |
| *G06K 9/00* | (2022.01) |
| *G06K 9/62* | (2022.01) |
| *G06K 9/52* | (2006.01) |
| *G06T 7/62* | (2017.01) |
| *G06T 3/40* | (2006.01) |

(Continued)

(52) U.S. Cl.
CPC ..... *H04N 5/23222* (2013.01); *H04N 5/23216* (2013.01); *H04N 5/23245* (2013.01); *H04N 5/23293* (2013.01)

(58) Field of Classification Search
CPC ........... H04N 5/23222; H04N 5/23216; H04N 5/23245; H04N 5/2628; G06K 9/00;
(Continued)

(56) References Cited

U.S. PATENT DOCUMENTS

| | | | |
|---|---|---|---|
| 2008/0118156 A1* | 5/2008 | Okada | G06K 9/46 382/195 |
| 2010/0214321 A1 | 8/2010 | Hokkanen et al. | |

(Continued)

FOREIGN PATENT DOCUMENTS

| | | |
|---|---|---|
| CN | 107155064 A | 9/2017 |
| CN | 107181913 A | 9/2017 |

(Continued)

OTHER PUBLICATIONS

Extended European Search Report in Application No. 20171835, dated Oct. 2, 2020.

(Continued)

*Primary Examiner* — Marly S Camargo
(74) *Attorney, Agent, or Firm* — Syncoda LLC; Feng Ma

(57) ABSTRACT

An image capturing method can be applied to an application, and include: determining a dimension adjustment approach set for a preset object in an acquired image to be processed after a dimension adjustment function of the application is turned on; and obtaining and displaying an adjusted image by adjusting a dimension of the preset object in the image to be processed according to the dimension adjustment approach, so as to support real-time preview of the adjusted image. As the dimension of the preset object in the image to be processed is adjusted in the image capturing process, the image capturing experience of the user is improved, and satisfying photos or videos can be obtained quickly.

20 Claims, 3 Drawing Sheets

--- determining a dimension adjustment approach set for a preset object in an acquired image to be processed after a dimension adjustment function of an application is turned on — S101 obtaining an adjusted image by adjusting a dimension of the preset object in the image to be processed according to the determined dimension adjustment approach — S102 displaying the adjusted image — S103

(51) Int. Cl.
*G06T 7/00* (2017.01)
*G06T 15/00* (2011.01)

(58) Field of Classification Search
CPC ........ G06K 9/62; G06K 9/52; G06K 9/00744; G06T 3/4038; G06T 7/004; G06T 7/62; G06T 15/00
USPC .......... 348/42, 207.1, 207.99, 222.1, 240.99, 348/345, 208.12, 208.163, 211.9; 382/118, 159, 165, 170, 181, 256, 291, 382/255, 254; 345/660, 670, 671, 679, 345/680, 684, 419
See application file for complete search history.

(56) References Cited

U.S. PATENT DOCUMENTS

| | | | | |
|---|---|---|---|---|
| 2012/0007997 | A1* | 1/2012 | Oikawa | H04N 5/228 348/208.6 |
| 2012/0075291 | A1* | 3/2012 | Sohn | G06T 15/00 345/419 |
| 2012/0098992 | A1* | 4/2012 | Hosoe | H04N 5/228 348/333.11 |
| 2016/0171308 | A1 | 6/2016 | Kawai | |
| 2018/0288355 | A1 | 10/2018 | Minami et al. | |
| 2020/0320331 | A1* | 10/2020 | Wee | G06K 9/00 |

FOREIGN PATENT DOCUMENTS

| | | |
|---|---|---|
| CN | 107592459 A | 1/2018 |
| EP | 2434768 A2 | 3/2012 |
| EP | 3483653 A1 | 5/2019 |

OTHER PUBLICATIONS

Parametric reshaping of human bodies in images, S. Zhou et al., ACM Transactions on Graphics, vol. 29, No. 4, Article 126, Jul. 26, 2010, pp. 1-10, XP058312544.

CN first office action in Application No. 201911154438.4, dated Jan. 6, 2022.

* cited by examiner

IMAGE CAPTURING METHOD AND DEVICE

CROSS-REFERENCE TO RELATED APPLICATION

This application claims priority to Chinese Patent Application No. 201911154438.4 filed on Nov. 22, 2019, the disclosure of which is hereby incorporated by reference in its entirety.

BACKGROUND

With the development of software technologies, a large number of applications with image capturing (e.g., taking photos or capturing videos) functions have been launched on mobile terminal platforms, and some of these applications further have photo-editing function. Users can edit captured photos to obtain effects as desired.

SUMMARY

The present disclosure relates generally to the technical field of computer communications, and more specifically to an image capturing method and device.

Various embodiments of the present disclosure provide an image capturing method and device which can obtain an adjusted image by adjusting the dimension of a preset object in an acquired image to be processed and support the real-time preview of the adjusted image.

According to a first aspect of some embodiments of the present disclosure, there is provided an image capturing method being applied to an application and including:

determining a dimension adjustment approach set for a preset object in an acquired image to be processed after a dimension adjustment function of the application is turned on;

obtaining an adjusted image by adjusting a dimension of the preset object in the image to be processed according to the dimension adjustment approach; and displaying the adjusted image.

In some embodiments, the preset object includes a first object and a second object; and the determining the dimension adjustment approach set for the preset object in the acquired image to be processed includes:

determining an image capturing distance of the first object when capturing the image to be processed;

determining an image dimension of the second object in the image to be processed when capturing at the image capturing distance; and determining to adjust the dimension of the second object in the image to be processed to be the image dimension.

In some embodiments, the determining the dimension adjustment approach set for the preset object in the acquired image to be processed includes any one of:

determining the dimension adjustment approach based on settings of a user on the displayed image; and automatically setting the dimension adjustment approach.

In some embodiments, the determining the dimension adjustment approach based on the settings of the user on the displayed image includes any one of:

determining a first target dimension of a third object based on a first dimension adjustment operation of the user on the third object in the displayed image when the displayed image includes the third object, and determining to adjust a dimension of the third object in the image to be processed to be the first target dimension;

determining a dimension adjustment range based on a second dimension adjustment operation of the user on a third object in the displayed image when the displayed image includes the third object and a fourth object, and determining to adjust a dimension of the fourth object in the image to be processed according to the dimension adjustment range;

determining a second target dimension of a third object based on a third dimension adjustment operation of the user on the third object in the displayed image when the displayed image includes the third object and a fifth object, and determining to adjust a dimension of the fifth object in the image to be processed to be the second target dimension;

determining a third object based on an object selection operation of the user executed on the displayed image when the displayed image includes the third object and a sixth object, determining a dimension of the third object in the image to be processed, and determining to adjust a dimension of the sixth object in the image to be processed to be the dimension of the third object; and determining a dimension adjustment ratio inputted by the user on the displayed image, and determining to adjust a dimension of the preset object in the image to be processed according to the dimension adjustment ratio.

In some embodiments, the automatically setting the dimension adjustment approach includes any one of:

determining a dimension of a standard object in the image to be processed, determining to adjust a dimension of a non-standard object in the image to be processed to be the dimension of the standard object, in which the standard object includes: an object with maximum image size or an object with minimum image size; and determining a dimension adjustment ratio, and determining to adjust a dimension of the preset object in the image to be processed according to the dimension adjustment ratio.

In some embodiments, the determining the dimension adjustment approach set for the preset object in the acquired image to be processed includes:

determining a target dimension adjustment mode based on an adjustment mode switching operation of a user executed on the displayed image; and determining the dimension adjustment approach under the target dimension adjustment mode.

According to a second aspect of some embodiments of the present disclosure, there is provided an image capturing device applying an application and comprising:

a determination portion configured to determine a dimension adjustment approach set for a preset object in an acquired image to be processed after a dimension adjustment function of the application is turned on;

an adjustment portion configured to obtain an adjusted image by adjusting a dimension of the preset object in the image to be processed according to the dimension adjustment approach; and a display portion configured to display the adjusted image.

In some embodiments, the preset object includes a first object and a second object; and the determination portion includes:

a first determination sub-portion configured to determine an image capturing distance of the first object when capturing the image to be processed;

a second determination sub-portion configured to determine an image dimension of the second object in the image to be processed when capturing at the image capturing distance; and a third determination sub-portion configured to determine to adjust a dimension of the second object in the image to be processed to be the image dimension.

In some embodiments, the determination portion includes any one of:

a fourth determination sub-portion configured to determine the dimension adjustment approach based on settings of a user on the displayed image; and an automatic setting sub-portion configured to automatically set the dimension adjustment approach.

In some embodiments, the fourth determination sub-portion includes any one of:

a first determination unit configured to determine a first target dimension of a third object based on a first dimension adjustment operation of the user on the third object in the displayed image when the displayed image includes the third object, and determine to adjust a dimension of the third object in the image to be processed to be the first target dimension;

a second determination unit configured to determine a dimension adjustment range of a third object based on a second dimension adjustment operation of the user on the third object in the displayed image when the displayed image includes the third object and a fourth object, and determine to adjust a dimension of the fourth object in the image to be processed according to the dimension adjustment range;

a third determination unit configured to determine a second target dimension of a third object based on a third dimension adjustment operation of the user on the third object in the displayed image when the displayed image includes the third object and a fifth object, and determine to adjust a dimension of the fifth object in the image to be processed to be the second target dimension;

a fourth determination unit configured to determine a third object based on an object selection operation of the user executed on the displayed image when the displayed image includes the third object and a sixth object, determine a dimension of the third object in the image to be processed, and determine to adjust a dimension of the sixth object in the image to be processed to be the dimension of the third object; and a fifth determination unit configured to determine a dimension adjustment ratio inputted by the user on the displayed image, and determine to adjust a dimension of the preset object in the image to be processed according to the dimension adjustment ratio.

In some embodiments, the automatic setting sub-portion includes any one of:

a first automatic setting unit configured to determine a dimension of a standard object in the image to be processed, and determine to adjust a dimension of a non-standard object in the image to be processed to be the dimension of the standard object, in which the standard object includes an object with maximum image size or an object with minimum image size; and a second automatic setting unit configured to determine a dimension adjustment ratio and determine to adjust a dimension of the preset object in the image to be processed according to the dimension adjustment.

In some embodiments, the determination portion includes:

a fifth determination sub-portion configured to determine a target dimension adjustment mode based on an adjustment mode switching operation of a user executed on the displayed image; and a sixth determination sub-portion configured to determine the dimension adjustment approach under the target dimension adjustment mode.

According to a third aspect of some embodiments of the present disclosure, there is provided a non-transitory computer-readable memory medium having stored therein computer programs, when executed by a processor, implementing steps of the method as described in any one of the above first aspect.

According to a fourth aspect of some embodiments of the present disclosure, there is provided an image capturing device comprising:

a processor; and a memory configured to store processor-executable instructions;

wherein the processor is configured to:

determine a dimension adjustment approach set for a preset object in an acquired image to be processed after a dimension adjustment function of an application is turned on;

obtain an adjusted image by adjusting a dimension of the preset object in the image to be processed according to the dimension adjustment approach; and display the adjusted image.

It should be understood that the above general description and the following detailed description are exemplary and explanatory, and are not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of devices and methods consistent with aspects related to the disclosure as recited in the appended claims.

Terms used in this disclosure are only for the purpose of describing specific embodiments instead of limiting this disclosure. The singular forms "a/an," "the" and "said" used in this disclosure and the attached claims are intended to include the plural forms, unless the context clearly indicates otherwise. It should be understood that terms "and/or" used herein refers to and comprises any or all possible combinations of one or more of the associated listed items.

It should be understood that, although the terms "first," "second" and "third," etc. may be used in the disclosure to describe various information, this information should not be limited by these terms. These terms are only used to distinguish same type of information from each other. For example, without departing from the scope of this disclosure, first information may be referred to as second information. Similarly, the second information may be referred to as the first information. Based on the context, for example, a word "if" used herein may be explained as "while/as" or "when" or "in response to determining."

Various embodiments of the present disclosure provide an image capturing method, which can be applied to a terminal having a function of sending information. The terminal can be a mobile phone, a tablet computer, a personal digital assistant, etc. Herein, "shooting" or "image capturing" refers generally to taking photos/picture/videos or capturing images, etc.

Typically, after a photo is captured, the application displays the captured photo. The user moves a selection box to a specified area of the photo to trigger the application to select a portion of the photo in the specified area, and then increases the size of the selection box to trigger the application to enlarge the selected photo and overlay the enlarged photo on the original photo, so as to achieve partial enlargement of the photo.

Various embodiments of the present disclosure can address that the above method can enlarge only the selected part of the photo in the selection box as a whole, and can only adjust the size of the photo after the photo is generated, which cannot meet various image capturing needs of users.

Figure 1:
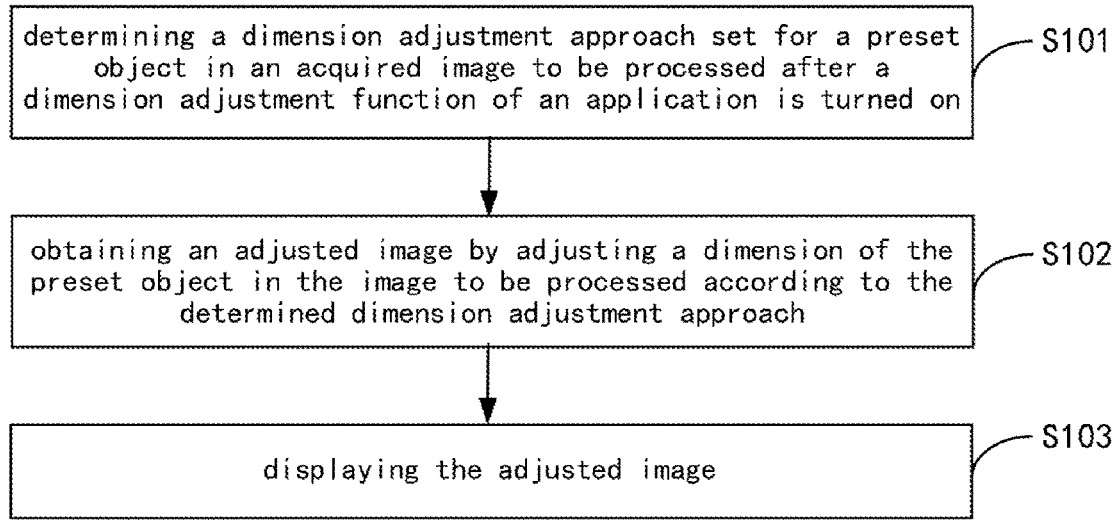
FIG. 1 is a flowchart illustrating an image capturing method in accordance with some embodiments.

FIG. 1 is a flowchart illustrating an image capturing method in some embodiments. The method as shown in FIG. 1 is applied to an application and comprises the following steps:

S101: determining a dimension adjustment approach set for a preset object in an acquired image to be processed after the dimension adjustment function of the application is turned on.

In some embodiments of the present disclosure, the application has image capturing function. In general, the image capturing function includes photographing function and video recording function. The application may be a camera application, a short video application or the like. The application also has dimension adjustment function. In the image capturing process, after the dimension adjustment function is turned on, the dimension of the preset object in the acquired image to be processed may be adjusted. The image to be processed is an image that has been acquired during the image capturing process but not processed and displayed yet. The number of the preset objects is one or more.

The application may have one or more dimension adjustment modes. Each dimension adjustment mode corresponds to a specific dimension adjustment approach. An option may be set for each dimension adjustment mode. The user selects the option and triggers the application to adjust the dimension of the object in the image according to the specific dimension adjustment approach under corresponding dimension adjustment mode.

By utilizing face recognition technologies, the application may perform face recognition on the image to be processed, recognize the face or head in the image to be processed, and determine the dimension adjustment approach set for the face or head in the image to be processed.

Figure 2:
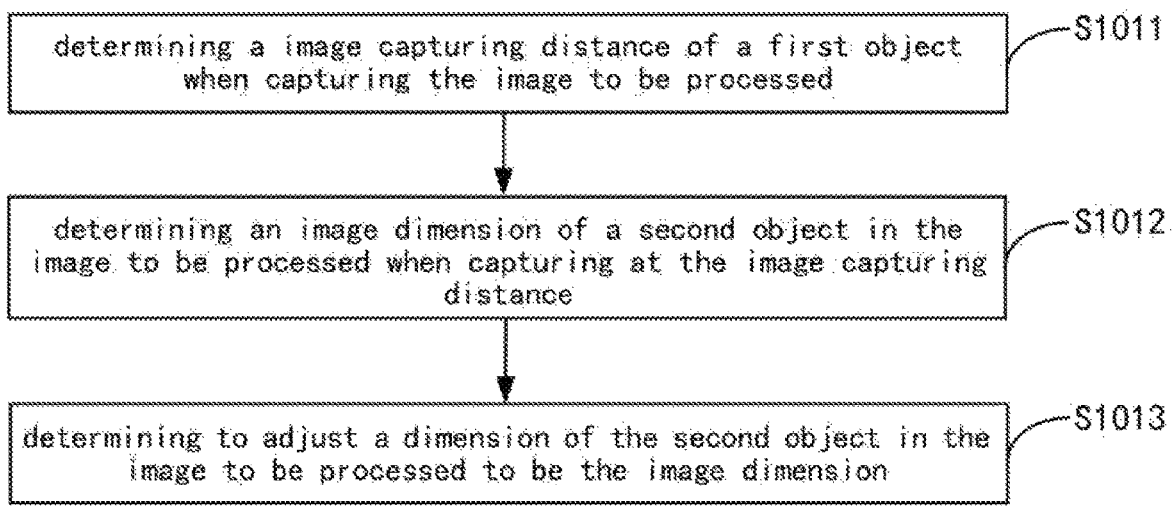
FIG. 2 is a flowchart illustrating another image capturing method in accordance with some embodiments.

In some embodiments, the preset object includes a first object and a second object. FIG. 2 is a flowchart of another image capturing method in accordance with some embodiments. Referring to FIG. 2, the operation of determining the dimension adjustment approach set for the preset object in the acquired image to be processed may be implemented by the following steps: S1011: determining an image capturing distance of a first object when shooting/capturing the image to be processed; S1012: determining an image dimension of a second object in the image to be processed when shooting/capturing at the image capturing distance; and S1013: determining to adjust a dimension of the second object in the image to be processed to be the image dimension.

In the step S1011, the application determines a first object from the image to be processed at first, and then determines an image capturing distance of the first object. The approach for determining a first object from the image to be processed is various. One approach is to: automatically select the first object from the image to be processed according to the preset selection rule. Illustratively, the first object with maximum size is selected from all the objects displayed in the image to be processed according to the maximum object dimension rule, or the first object with minimum size is selected from all the objects displayed in the image to be processed according to the minimum object dimension rule, or the first object is selected according to predetermined image capturing position.

The other approach is that: the application determines a first object based on the selection operation of the user on the first object in a displayed image. The displayed image is an image that is displayed before the image to be processed and has been displayed on a terminal.

The application can have an equidistant adjustment mode. When the equidistant adjustment mode is turned on, the step S1011 is executed.

A function camera is mounted on a terminal provided with the application and utilized to determine the image capturing distance of the first object when shooting/capturing the image to be displayed. The function camera may be a binocular camera, etc.

In the step S1012, the application determines an image dimension of a second object when shooting/capturing at the image capturing distance of the first object. When the image capturing distance of the second object is greater than the image capturing distance of the first object, the image dimension determined in this step is greater than an original image dimension of the second object in the image to be processed. When the image capturing distance of the second object is less than the image capturing distance of the first object, the image dimension determined based on the above method is less than an original image dimension of the second object in the image to be processed.

In the step S1013, a dimension of the second object in the image to be processed is adjusted to be the image dimension determined in the step S1012, so that the image to be processed can show the image capturing effect of the first object and the second object at the same image capturing distance.

In a multi-person image capturing scene, by image capturing through the above method, it can be avoided that the face or head of a nearer person in the photo or video is too large, so as to meet the image capturing needs of different users.

In some embodiments, the application may determine the dimension adjustment approach set for the preset object in the image to be processed based on the settings of the user on the displayed image.

The application may determine a first target dimension of a third object based on a first dimension adjustment operation of the user on a third object in the displayed image when the displayed image includes the third object, and determine to adjust the dimension of the third object in the image to be processed to be the first target dimension.

The application may have independent adjustment mode. After the independent adjustment mode is turned on, the application determines to adjust the dimension of the third object in the image to be processed to be the first target dimension based on the first dimension adjustment operation of the user on the third object in the displayed image. Accordingly, a first dimension adjustment approach is obtained.

Alternatively, the application may determine the dimension adjustment range of a third object based on the second dimension adjustment operation of the user on the third object in the displayed image when the displayed image includes the third object and a fourth object, and determine to adjust the dimension of the fourth object in the image to be processed according to the dimension adjustment range.

The fourth object may be all the objects or partial objects except the third object in the image to be processed. The fourth object may be selected by the user in the displayed image or automatically selected by the application based on the preset mechanism.

The dimension adjustment range can be variable, e.g., dimension variation, enlarged ratio, and reduced ratio.

The application may have constant-range adjustment mode. After the constant-range adjustment mode is turned on, the application determines to adjust the dimension of the fourth object in the image to be processed according to the dimension adjustment range of the third object. Accordingly, a second dimension adjustment approach is obtained.

Alternatively, the application determines the second target dimension of a third object based on the third dimension adjustment operation of the user on the third object in the displayed image when the displayed image includes the third object and a fifth object, and determines to adjust the dimension of the fifth object in the image to be processed to be the second target dimension.

The fifth object may be all the objects or partial objects except the third object in the image to be processed. The fifth object may be selected by the user in the displayed image or automatically selected by the application based on the preset mechanism.

The application may have unified adjustment mode. After the unified adjustment mode is turned on, the application determines the dimension of the fifth object in the image to be processed to be the second target dimension of the third object. Accordingly, a third dimension adjustment approach is obtained.

Alternatively, the application determines a third object based on the object selection operation of the user executed on the displayed image when the displayed image includes the third object and a sixth object, determines the dimension of the third object in the image to be processed, and determine to adjust the dimension of the sixth object in the image to be processed to be the dimension of the third object.

The sixth object may be all the objects or partial objects except the third object in the image to be processed. The sixth object may be selected by the user in the displayed image or automatically selected by the application based on the preset mechanism.

The application can have an equal-dimension adjustment mode. After the equal-dimension adjustment mode is turned on, the application determines to adjust the dimension of the sixth object in the image to be processed to be the dimension of the third object. Accordingly, a fourth dimension adjustment approach is obtained.

Alternatively, the application may determine the dimension adjustment ratio inputted by the user on the displayed image, and determine to adjust the dimension of the preset object in the image to be processed according to the dimension adjustment ratio.

The preset object may be all the objects or partial objects in the image to be processed. The preset object may be selected by the user in the displayed image or automatically selected by the application based on the preset mechanism.

The application may have equal-ratio adjustment mode. After the equal-ratio adjustment mode is turned on, the application determines to adjust the dimension of the preset object in the image to be processed according to the dimension adjustment ratio. Accordingly, a fifth dimension adjustment approach is obtained. When there are a plurality of the preset objects, the equal-ratio dimension adjustment is performed on the plurality of preset objects in the image to be processed according to the dimension adjustment ratio.

In some embodiments, the application may automatically set the dimension adjustment approach for the preset object in the image to be processed.

The application may determine the dimension of a standard object in the image to be processed, and determine to adjust the dimension of a non-standard object in the image to be processed to be the dimension of the standard object.

The standard object may be an object with maximum size in the image to be processed, and the dimension of the standard object may be the maximum image dimension in the image dimension of all the objects in the image to be processed.

The standard object may be an object with minimum size in the image to be processed, and the dimension of the standard object may be the minimum image dimension in the image dimension of all the objects in the image to be processed.

The non-standard object may be all the other objects or partial objects except the standard object in the image to be processed.

The application may have a first automatic adjustment mode. After the first automatic adjustment mode is turned on, the application determines to adjust the dimension of the non-standard object in the image to be processed to be the dimension of the standard object. Accordingly, a sixth dimension adjustment mode is obtained.

Alternatively, the application may determine the dimension adjustment ratio and determine to adjust the dimension of the preset object in the image to be processed according to the dimension adjustment ratio.

The preset object may be all the objects or partial objects in the image to be processed. The dimension adjustment ratio may include: dimension-enlarging scale, dimension-reducing scale, etc.

The application may have a second automatic adjustment mode. After the second automatic adjustment mode is turned on, the application determines to adjust the dimension of the preset object in the image to be processed according to the dimension adjustment ratio, and obtains the seventh dimension adjustment mode.

For instance, after the second automatic adjustment mode is turned on, the application recognizes all the heads in the image to be processed, and adjusts the dimension of all the heads in the image to be processed with the same enlarged scale according to the enlarged dimension scale set by the user.

In the above two embodiments, there are various operational forms for the dimension adjustment operation executed by the user on the displayed image. For instance, the application acquires an object image after recognizing the object in the image to be processed; a border may be set at the edge of the object image; the user may change the dimension of the object image by dragging the border; and in this case, the dimension adjustment operation is the dragging action on the image border.

Moreover, a display interface of the application is provided with dimension adjustment tools, such as a scroll bar, up and down keys, etc. The user may click the object image at first and then use the dimension adjustment tools to realize the dimension adjustment of the object image. Furthermore, the user may adopt the dimension adjustment tools at one time to realize the dimension adjustment of a plurality of object images in the image to be processed; and in this case, the dimension adjustment operation is the operation of using the dimension adjustment tools.

The above is only illustrative, and not limitative of the operational forms of the dimension adjustment operation.

In some embodiments, the application may have two or more dimension adjustment modes, such as two or more selected from the independent adjustment mode, the constant-range adjustment mode, the equidistant adjustment mode, the unified adjustment mode, the equal-ratio adjustment mode, the first automatic adjustment mode, and the second automatic adjustment mode described above.

In this case, the operation of the application in determining the dimension adjustment approach set for the preset object in the acquired image to be processed may be implemented by the following approach: firstly, determining the target dimension adjustment mode based on the adjustment mode switching operation of the user executed on the displayed image; and secondly, determining the dimension adjustment approach under the target dimension adjustment mode.

The switching of the dimension adjustment mode is realized based on the above function settings.

S102: obtaining an adjusted image by adjusting the dimension of the preset object in the image to be processed according to the determined dimension adjustment approach.

The dimension of the third object in the image to be processed is adjusted to be the first target dimension based on the determined first dimension adjustment approach.

The dimension of the fourth object in the image to be processed is adjusted according to the dimension adjustment range of the third object based on the determined second dimension adjustment approach.

The dimension of the fifth object in the image to be processed is adjusted to be the second target dimension of the third object based on the determined third dimension adjustment approach.

The dimension of the sixth object in the image to be processed is adjusted to be the dimension of the third object based on the determined fourth dimension adjustment approach.

The plurality of preset objects in the image to be processed are subjected to equal-ratio dimension adjustment according to the same dimension adjustment ratio based on the determined fifth dimension adjustment approach.

The dimension of the non-standard object in the image to be processed is adjusted to be the dimension of the standard object based on the sixth dimension adjustment approach.

The plurality of preset objects in the image to be processed are subjected to equal-ratio dimension adjustment according to the same dimension adjustment ratio based on the determined seventh dimension adjustment approach.

S103: displaying the adjusted image.

The adjusted image obtained based on the image to be processed is displayed.

In the photographing scene, the application generates a photo based on the content of the adjusted image after acquiring a photographing instruction.

In the video recording scene, in the video recording process, the application generates and stores video frames based on the content of the adjusted image after obtaining the adjusted image.

In the video recording scene, before video recording starts, the application adjusts the dimension of the object in the acquired image in this stage according to the specific dimension adjustment approach; and after video recording starts, the application adjusts the dimension of the object in the acquired image in the recording stage according to the same dimension adjustment approach.

For instance, before video recording starts, there are two persons in the image captured by the application; the application adjusts the image dimension of the two persons respectively based on the dimension adjustment operation of the user; after the dimension adjustment ends, the first person in the image corresponds to the first image dimension, and the second person in the image corresponds to the second image dimension; and after video recording starts, the first person in the image acquired in the video recording stage is adjusted to have the first image dimension, and the second person is adjusted to have the second image dimension.

In some embodiments of the present disclosure, the application has dimension adjustment function. In the image capturing process, after the dimension adjustment function is turned on, the application may adjust the dimension of the object in the acquired image to be processed, and obtain the adjusted image, so as to support the real-time preview of the adjusted image. As the dimension of the object is adjusted in the image capturing process, the image capturing experience of the user is improved, and the satisfying photos or videos can be obtained quickly.

For simple description, the foregoing embodiments of the method are all described as a series of action combinations. However, it should be known by those skilled in the art that the present disclosure is not limited by the described orders of actions, because some steps may be performed in other orders or simultaneously in accordance with the present disclosure.

Secondly, it should be also known by those skilled in the art that some embodiments described in the specification are optional, and the actions and portions involved are not necessary in the present disclosure.

Corresponding to the foregoing embodiments of a method, the present disclosure also provides embodiments of a device and corresponding terminal of implementing application function.

Figure 3:
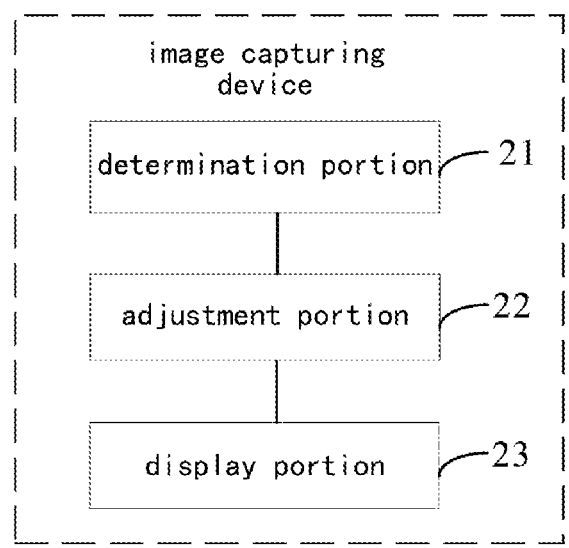
FIG. 3 is a block diagram illustrating an image capturing device in accordance with some embodiments.

FIG. 3 is a block diagram illustrating an image capturing device in accordance with some embodiments. The device is applied to an application and comprises: a determination portion 21, an adjustment portion 22 and a display portion 23, wherein:

the determination portion 21 is configured to determine the dimension adjustment approach set for a preset object in an acquired image to be processed after the dimension adjustment function of the application is turned on;

the adjustment portion 22 is configured to adjust the dimension of the preset object in the image to be processed according to the dimension adjustment approach, and obtain an adjusted image; and the display portion 23 is configured to display the adjusted image.

Figure 4:
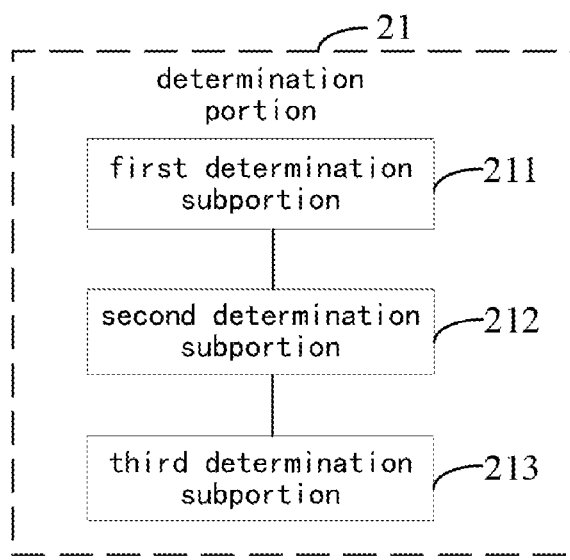
FIG. 4 is a block diagram illustrating another image capturing device in accordance with some embodiments.

In some embodiments, the preset object includes a first object and a second object. On the basis of the image capturing device as shown in FIG. 3, referring to FIG. 4, the determination portion 21 may include: a first determination sub-portion 211, a second determination sub-portion 212, and a third determination sub-portion 213, wherein:

the first determination sub-portion 211 is configured to determine an image capturing distance of the first object when image capturing the image to be processed;

the second determination sub-portion 212 is configured to determine an image dimension of the second object in the image to be processed when shooting/capturing at the image capturing distance; and the third determination sub-portion 213 is configured to determine to adjust a dimension of the second object in the image to be processed to be the image dimension.

In some embodiments, on the basis of the image capturing device as shown in FIG. 3, the determination portion 21 may include any one of a fourth determination sub-portion and an automatic setting sub-portion, wherein:

the fourth determination sub-portion is configured to determine the dimension adjustment approach based on the settings of the user on the displayed image; and the automatic setting sub-portion is configured to automatically set the dimension adjustment approach.

In some embodiments, the fourth determination sub-portion may include any one of a first determination unit, a second determination unit, a third determination unit, a fourth determination unit, and a fifth determination unit, wherein:

the first determination unit is configured to determine a first target dimension of a third object based on a first dimension adjustment operation of the user on the third object in the displayed image when the displayed image includes the third object, and determine to adjust a dimension of the third object in the image to be processed to be the first target dimension;

the second determination unit is configured to determine a dimension adjustment range of a third object based on a second dimension adjustment operation of the user on the third object in the displayed image when the displayed image includes the third object and a fourth object, and determine to adjust a dimension of the fourth object in the image to be processed according to the dimension adjustment range;

the third determination unit is configured to determine a second target dimension of a third object based on a third dimension adjustment operation of the user on the third object in the displayed image when the displayed image includes the third object and a fifth object, and determine to adjust a dimension of the fifth object in the image to be processed to be the second target dimension;

the fourth determination unit is configured to determine the third object based on the object selection operation of the user executed on the displayed image when the displayed image includes the third object and a sixth object, determine the dimension of the third object in the image to be processed, and determine to adjust a dimension of the sixth object in the image to be processed to be the dimension of the third object; and the fifth determination unit is configured to determine a dimension adjustment ratio inputted by the user on the displayed image, and determine to adjust the dimension of the preset object in the image to be processed according to the dimension adjustment ratio.

In some embodiments, the automatic setting sub-portion may include any one of a first automatic setting unit and a second automatic setting unit, wherein:

the first automatic setting unit is configured to determine a dimension of a standard object in the image to be processed, and determine to adjust a dimension of a non-standard object in the image to be processed to be the dimension of the standard object, in which the standard object includes an object with maximum image size or an object with minimum image size; and the second automatic setting unit is configured to determine a dimension adjustment ratio and determine to adjust a dimension of the preset object in the image to be processed according to the dimension adjustment ratio.

In some embodiments, on the basis of the image capturing device as shown in FIG. 3, the determination portion 21 may include a fifth determination sub-portion and a sixth determination sub-portion, wherein:

the fifth determination sub-portion is configured to determine a target dimension adjustment mode based on the adjustment mode switching operation of the user executed on the displayed image; and the sixth determination sub-portion is configured to determine the dimension adjustment approach under the target dimension adjustment mode.

As some embodiments of the device substantially correspond to some embodiments of the method, relevant parts may refer to the partial description of some embodiments of the method. Some embodiments of the device described above are only schematic, in which the units described as separate components may or may not be physically separated, and the components shown as units may or may not be physical units, that is, they may be disposed in one place, or may be distributed on multiple network elements. Some or all of the portions may be selected according to actual needs to achieve the objectives of the solutions of the present disclosure. They can be understood and implemented by those of ordinary skill in the art without creative efforts.

Correspondingly, one aspect of some embodiments of the present disclosure provides an image capturing device, which comprises: a processor; and a memory configured to store processor-executable instructions, wherein the processor is configured to:

determine a dimension adjustment approach set for a preset object in an acquired image to be processed after a dimension adjustment function of an application is turned on;

obtain an adjusted image by adjusting a dimension of the preset object in the image to be processed according to the dimension adjustment approach; and display the adjusted image.

Figure 5:
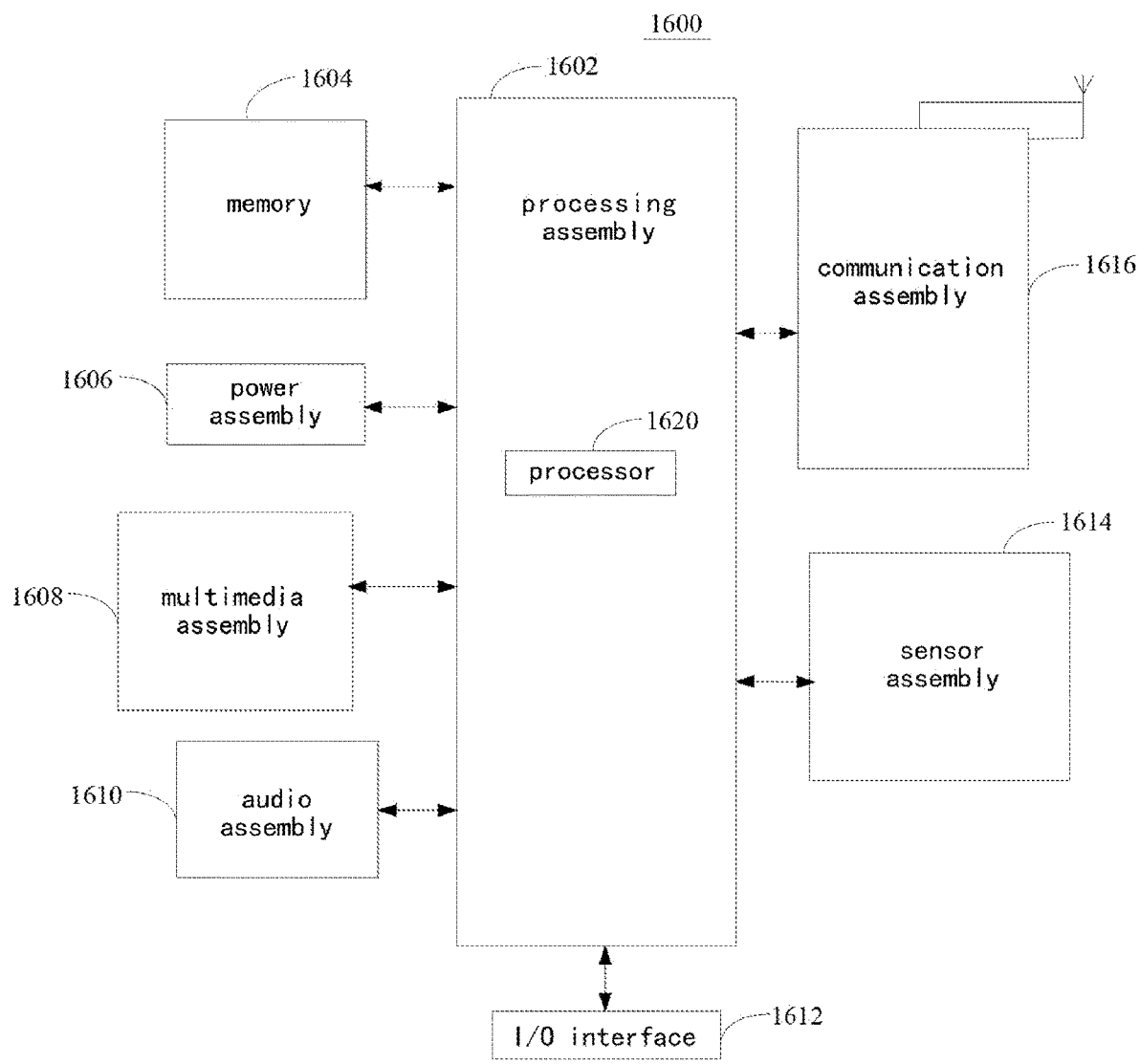
FIG. 5 is a schematic structural view illustrating an image capturing device in accordance with some embodiments.

FIG. 5 is a schematic structural view of an image capturing device 1600 in accordance with some embodiments. For instance, the device 1600 may be a user device, specifically a mobile phone, a computer, a digital broadcast terminal, a messaging device, a game console, a tablet, a medical device, a fitness apparatus, a personal digital assistant, or a wearable device such as a smart watch, smart glasses, a smart wristband, smart running shoes, etc.

Referring to FIG. 5, the device 1600 may comprise one or more of a processing assembly 1602, a memory 1604, a power assembly 1606, a multi-media assembly 1608, an audio assembly 1610, an input/output (I/O) interface 1616, a sensor assembly 1614 and a communication assembly 1616.

The processing assembly 1602 typically controls overall operations of the device 800, such as the operations associated with display, telephone calls, data communications, camera operations, and recording operations. The processing assembly 1602 may include one or more processors 1620 to execute instructions to perform all or part of the steps in the above methods. Moreover, the processing assembly 1602 may include one or more portions which facilitate the interaction between the processing assembly 1602 and other assemblies. For instance, the processing assembly 1602 may include a multimedia portion to facilitate the interaction between the multimedia assembly 1608 and the processing assembly 1602.

The memory 1604 is configured to store various types of data to support the operation of the device 1600. Examples of such data include instructions for any applications or methods operated on the device 1600, contact data, phone-book data, messages, pictures, video, etc. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power assembly 1606 provides power to various assemblies of the device 1600. The power assembly 1606 may include a power management system, one or more power sources, and any other assemblies associated with the generation, management, and distribution of power in the device 1600.

The multimedia assembly 1608 includes a screen providing an output interface between the device 1600 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and pressure associated with the touch or swipe action. In some embodiments, the multimedia assembly 1608 includes a front camera and/or a rear camera. The front camera and the rear camera may receive external multimedia data while the device 1600 is in an operation mode, such as an adjusting mode or a video mode. Each of the front camera and the rear camera may be a fixed optical lens system or have focus and optical zoom capability.

The mobile terminal can have the application installed thereon with the dimension adjustment function implemented with operations on the touch screen. For example, the dimension adjustment function turned on or off with a touch operation.

Touch operations such as sliding operation on the touch screen can realize zooming of the preview image, in an example.

The audio assembly 1610 is configured to output and/or input audio signals. For example, the audio assembly 1610 includes a microphone ("MIC") configured to receive an external audio signal when the device 1600 is in an operation mode, such as a call mode, a recording mode, and a voice recognition mode. The received audio signal may be further stored in the memory 1604 or transmitted via the communication assembly 1616. In some embodiments, the audio assembly 1610 further includes a speaker to output audio signals.

The I/O interface 1612 provides an interface between the processing assembly 1602 and peripheral interface portions, such as a keyboard, a click wheel, buttons, and the like. The buttons may include, but are not limited to, a home button, a volume button, a starting button, and a locking button.

The sensor assembly 1614 includes one or more sensors to provide status assessments of various aspects of the device 1600. For instance, the sensor assembly 1614 may detect an open/closed status of the device 1600, relative positioning of assemblies, e.g., the display and the keypad, of the device 1600, a change in position of the device 1600 or an assembly of the device 1600, a presence or absence of user contact with the device 1600, an orientation or an acceleration/deceleration of the device 1600, and a change in temperature of the device 1600. The sensor assembly 1614 may include a proximity sensor configured to detect the presence of nearby objects without any physical contact. The sensor assembly 1614 may also include a light sensor, such as a CMOS or CCD image sensor, for use in imaging applications. In some embodiments, the sensor assembly 1614 may also include an accelerometer sensor, a gyroscope sensor, a magnetic sensor, a pressure sensor, or a temperature sensor.

The communication assembly 1616 is configured to facilitate communication, wired or wirelessly, between the device 1600 and other devices. The device 1600 can access a wireless network based on a communication standard, such as Wi-Fi, 2G, 3G, 4G, 5G, or a combination thereof. In some embodiments, the communication assembly 1616 receives a broadcast signal or broadcast associated information from an external broadcast management system via a broadcast channel. In some embodiments, the communication assembly 1616 further includes a near field communication (NFC) portion to facilitate short-range communications. For example, the NFC portion may be implemented based on a radio frequency identification (RFID) technology, an infra-red data association (IrDA) technology, an ultra-wideband (UWB) technology, a Bluetooth (BT) technology, and other technologies.

In some embodiments, the device 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic assemblies, for performing the above methods.

In some embodiments, there is also provided a non-transitory computer-readable storage medium such as the memory 1604 including instructions. When the instructions in the storage medium are executable by the processor 1620 in the device 1600, the device 1600 can perform the image capturing method. The method comprises: determining the dimension adjustment approach set for a preset object in an acquired image to be processed after a dimension adjustment function of the application is turned on; obtaining an adjusted image by adjusting the preset object in the image to be processed according to the dimension adjustment approach; and displaying the adjusted image.

The non-transitory computer-readable storage medium may be a ROM, a random-access memory (RAM), a CD-ROM, a magnetic tape, a floppy disc, an optical data storage device, and the like.

Various embodiments of the present disclosure can have one or more of the following advantages.

The application can have a dimension adjustment function; in the image capturing process of the application, after the dimension adjustment function is turned on, the adjusted image can be obtained by adjusting the dimension of the preset object in the acquired image to be processed, so as to support the real-time preview of the adjusted image. As the dimension of the preset object is adjusted in the image capturing process, the image capturing experience of the user is improved, and satisfying photos or videos can be obtained quickly.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or device.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of module, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "module," "portion," "components" or "layers," etc. merely reflect various logical functions according to some embodiments, and actual implementations can have other divisions of "regions," "module," "components" or "layers," etc. realizing similar functions as described above, or without divisions. For example, multiple regions, module, portion, or layers, etc. can be combined or can be integrated into another system. In addition, some features can be omitted, and some steps in the methods can be skipped.

Those of ordinary skill in the art will appreciate that the module, components, regions, or layers, etc. in the devices provided by various embodiments described above can be provided in the one or more devices described above. They can also be located in one or multiple devices that is (are) different from the example embodiments described above or illustrated in the accompanying drawings. For example, the module, regions, or layers, etc. in various embodiments described above can be integrated into one module or divided into several sub-modules.

The various device components, modules, module, blocks, or portions may have modular configurations, or are composed of discrete components, but nonetheless can be referred to as "modules" in general. In other words, the "components," "modules," "blocks," "portions," or "module" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the some embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. An image capturing method, applied to an application with image capturing functions including photographing function and/or video recording function, comprising:
  determining a dimension adjustment approach set for a preset object in an acquired image to be processed after a dimension adjustment function of the application is turned on, in an image capturing process;
  obtaining an adjusted image by adjusting a dimension of the preset object in the image to be processed according to the dimension adjustment approach in the image capturing process, wherein the image capturing process includes photographing process and/or video recording process, and the image to be processed is an image that has been acquired during the image capturing process but not processed and displayed yet; and
  generating and displaying a photo or video frame based on content of the adjusted image.

2. The method according to claim 1, wherein the preset object comprises a first object and a second object; and the determining the dimension adjustment approach set for the preset object in the acquired image to be processed comprises:
  determining an image capturing distance of the first object when capturing the image to be processed;
  determining an image dimension of the second object in the image to be processed when capturing at the image capturing distance; and
  determining to adjust a dimension of the second object in the image to be processed to be the image dimension.

3. The method according to claim 1, wherein the determining the dimension adjustment approach set for the preset object in the acquired image to be processed comprises one of:
  determining the dimension adjustment approach based on settings of a user on a displayed image; and
  automatically setting the dimension adjustment approach.

4. The method according to claim 3, wherein the determining the dimension adjustment approach based on the settings of the user on the displayed image comprises one of:
  determining a first target dimension of a third object based on a first dimension adjustment operation of the user on the third object in the displayed image when the displayed image comprises the third object, and determining to adjust a dimension of the third object in the image to be processed to be the first target dimension;
  determining a dimension adjustment range based on a second dimension adjustment operation of the user on a third object in the displayed image when the displayed image comprises the third object and a fourth object, and determining to adjust a dimension of the fourth object in the image to be processed according to the dimension adjustment range;
  determining a second target dimension of a third object based on a third dimension adjustment operation of the user on the third object in the displayed image when the displayed image comprises the third object and a fifth object, and determining to adjust a dimension of the fifth object in the image to be processed to be the second target dimension;

determining a third object based on an object selection operation of the user executed on the displayed image when the displayed image comprises the third object and a sixth object, determining a dimension of the third object in the image to be processed, and determining to adjust a dimension of the sixth object in the image to be processed to be the dimension of the third object; and determining the dimension adjustment ratio inputted by the user on the displayed image, and determining to adjust a dimension of the preset object in the image to be processed according to the dimension adjustment ratio.

5. The method according to claim 3, wherein the automatically setting the dimension adjustment approach comprises one of:

determining a dimension of a standard object in the image to be processed, determining to adjust a dimension of a non-standard object in the image to be processed to be the dimension of the standard object, in which the standard object comprises: an object with maximum image size or an object with minimum image size, the non-standard object includes all the other objects or partial objects except the standard object in the image to be processed; and determining a dimension adjustment ratio, and determining to adjust a dimension of the preset object in the image to be processed according to the dimension adjustment ratio.

6. The method according to claim 1, wherein the determining the dimension adjustment approach set for the preset object in the acquired image to be processed comprises:

determining a target dimension adjustment mode based on an adjustment mode switching operation of a user executed on the displayed image; and determining the dimension adjustment approach under the target dimension adjustment mode.

7. An image capturing device, applied to an application with an image capturing function including photographing function and/or video recording function, the device comprising:

a determination circuit configured to determine a dimension adjustment approach set for a preset object in an acquired image to be processed after a dimension adjustment function of the application is turned on, in an image capturing process;

an adjustment circuit configured to obtain an adjusted image by adjusting a dimension of the preset object in the image to be processed according to the dimension adjustment approach in the image capturing process, wherein the image capturing process includes photographing process and/or video recording process, and the image to be processed is an image that has been acquired during the image capturing process but not processed and displayed yet; and a display circuit configured to generate and display a photo or video frame based on content of the adjusted image.

8. The device according to claim 7, wherein the preset object comprises a first object and a second object; and the determination circuit comprises:

a first determination sub-circuit configured to determine an image capturing distance of the first object when capturing the image to be processed;

a second determination sub-circuit configured to determine an image dimension of the second object in the image to be processed when capturing at the image capturing distance; and a third determination sub-circuit configured to determine to adjust a dimension of the second object in the image to be processed to be the image dimension.

9. The device according to claim 7, wherein the determination circuit comprises one of:

a fourth determination sub-circuit configured to determine the dimension adjustment approach based on settings of a user on the displayed image; and an automatic setting sub-circuit configured to automatically set the dimension adjustment approach.

10. The device according to claim 9, wherein the fourth determination sub-circuit comprises one of:

a first determination circuit configured to determine a first target dimension of a third object based on a first dimension adjustment operation of the user on the third object in the displayed image when the displayed image comprises the third object, and determine to adjust a dimension of the third object in the image to be processed to be the first target dimension;

a second determination circuit configured to determine a dimension adjustment range of a third object based on a second dimension adjustment operation of the user on the third object in the displayed image when the displayed image comprises the third object and a fourth object, and determine to adjust a dimension of the fourth object in the image to be processed according to the dimension adjustment range;

a third determination circuit configured to determine a second target dimension of a third object based on a third dimension adjustment operation of the user on the third object in the displayed image when the displayed image comprises the third object and a fifth object, and determine to adjust a dimension of the fifth object in the image to be processed to be the second target dimension;

a fourth determination circuit configured to determine a third object based on an object selection operation of the user executed on the displayed image when the displayed image comprises the third object and a sixth object, determine a dimension of the third object in the image to be processed, and determine to adjust a dimension of the sixth object in the image to be processed to be the dimension of the third object; and a fifth determination circuit configured to determine a dimension adjustment ratio inputted by the user on the displayed image, and determine to adjust a dimension of the preset object in the image to be processed according to the dimension adjustment ratio.

11. The device according to claim 9, wherein the automatic setting sub-circuit comprises one of:

a first automatic setting circuit configured to determine a dimension of a standard object in the image to be processed, and determine to adjust a dimension of a non-standard object in the image to be processed to be the dimension of the standard object, in which the standard object comprises an object with maximum image size or an object with minimum image size, the non-standard object includes all the other objects or partial objects except the standard object in the image to be processed; and a second automatic setting circuit configured to determine a dimension adjustment ratio and determine to adjust a dimension of the preset object in the image to be processed according to the dimension adjustment ratio.

12. The device according to claim 7, wherein the determination circuit comprises:
    a fifth determination sub-circuit configured to determine a target dimension adjustment mode based on an adjustment mode switching operation of a user executed on the displayed image; and
    a sixth determination sub-circuit configured to determine the dimension adjustment approach under the target dimension adjustment mode.

13. A non-transitory computer-readable memory medium having stored thereon instructions for execution by a processing circuit to implement steps of the method of claim 1.

14. An image capturing device, comprising:
    a processor; and
    memory storing instructions for execution by the processor to:
    determine a dimension adjustment approach set for a preset object in an acquired image to be processed after a dimension adjustment function of an application is turned on, in an image capturing process;
    obtain an adjusted image by adjusting a dimension of the preset object in the image to be processed according to the dimension adjustment approach in the image capturing process, wherein the image capturing process includes photographing process and/or video recording process, and the image to be processed is an image that has been acquired during the image capturing process but not processed and displayed yet; and
    generate and display a photo or video frame based on content of the adjusted image.

15. A mobile terminal implementing the method of claim 1, wherein the mobile terminal has the application installed thereon with a dimension adjustment function.

16. The mobile terminal of claim 15, comprising a touch screen configured to have the dimension adjustment function turned on or off with a touch operation.

17. The mobile terminal of claim 16, wherein the mobile terminal is configured to obtain the adjusted image by adjusting the dimension of the preset object in the acquired image to be processed, thereby realizing a real-time preview of the adjusted image on the touch screen.

18. The mobile terminal of claim 17, wherein the mobile terminal is configured to perform face recognition on the image to be processed, recognize face or head in the image to be processed, and determine a dimension adjustment approach set for the face or head in the image to be processed.

19. The mobile terminal of claim 18, wherein
    the application has an equidistant adjustment mode;
    the preset object includes a first object and a second object; and
    the mobile terminal is configured to:
    determine an image capturing distance of the first object when capturing the image to be processed;
    determine an image dimension of the second object in the image to be processed when capturing at the image capturing distance; and
    adjust a dimension of the second object in the image to be processed to be the image dimension.

20. The mobile terminal of claim 19, further comprising a function binocular camera configured to measure the image capturing distance of the first object when capturing the image to be displayed.

* * * * *